United States Patent [19]
Cyr et al.

[11] Patent Number: 5,959,296
[45] Date of Patent: Sep. 28, 1999

[54] SCANNERS FOR READING NEAR INFRARED FLUORESCENT MARKS

[75] Inventors: Michael John Cyr; James John Krutak, Sr.; Horst Clauberg; Randy Barnett Meade; James Edward Moore, all of Kingsport, Tenn.; Gabor Patonay, Conyers, Ga.

[73] Assignee: Eastman Chemical Company, Kingsport, Tenn.

[21] Appl. No.: 08/880,037

[22] Filed: Jun. 20, 1997

Related U.S. Application Data

[60] Provisional application No. 60/020,308, Jun. 24, 1996.

[51] Int. Cl.$^6$ ...................................................... G06K 7/10
[52] U.S. Cl. ...................... 250/271; 106/31.15; 235/468; 283/92
[58] Field of Search ........................... 250/271; 235/468; 283/92; 106/31.15

[56] References Cited

U.S. PATENT DOCUMENTS

| 4,255,273 | 3/1981 | Sakkab . |
| 4,540,595 | 9/1985 | Acitelli et al. . |
| 4,606,859 | 8/1986 | Duggan et al. . |
| 4,769,307 | 9/1988 | Ozawa et al. . |
| 4,983,817 | 1/1991 | Dolash et al. . |
| 5,034,309 | 7/1991 | Tai et al. . |
| 5,292,855 | 3/1994 | Krutak et al. . |
| 5,331,140 | 7/1994 | Stephany . |
| 5,336,714 | 8/1994 | Krutak et al. . |
| 5,359,056 | 10/1994 | Kaieda et al. . |
| 5,366,714 | 11/1994 | Bigauskas . |
| 5,397,819 | 3/1995 | Krutak et al. . |
| 5,416,136 | 5/1995 | Konzmann et al. . |
| 5,423,432 | 6/1995 | Krutak et al. . |
| 5,525,516 | 6/1996 | Krutak et al. . |
| 5,553,714 | 9/1996 | Cushman et al. . |
| 5,629,512 | 5/1997 | Haga ........................................ 235/468 |
| 5,766,324 | 6/1998 | Ikegaya et al. ........................ 106/31.15 |
| 5,773,808 | 6/1998 | Laser .......................................... 235/462 |

FOREIGN PATENT DOCUMENTS

| 0 595 583 | 10/1993 | European Pat. Off. . |
| 2287533 | 3/1995 | United Kingdom . |

OTHER PUBLICATIONS

R. F. Coughlin and F. F. Driscoll, *Operational Amplifiers and Linear Integrated Circuits*, $2^{nd}$ (Englewood Cliffs, N.J.: Prentice–Hall, Inc., 1982). Table of Contents, pp. vii–xx.

*Topics In Applied Chemistry, Infrared Absorbing Dyes*, ed. Masaru Matsuoka (New York, N.Y.: Plenum Press, 1990). p. 58.

U.S. application No. 08/811,311, Near Infrared Fluorescent Security Thermal Transfer Printing and Marking Ribbons, filed Mar. 4, 1997, by Krutak et al.

*Primary Examiner*—Constantine Hannaher
*Attorney, Agent, or Firm*—Karen A. Harding; Mark L. Davis; Harry J. Gwinnell

[57] ABSTRACT

An apparatus for detecting an invisible, near infrared fluorescing mark disposed on a background comprises: includes an excitation source for exciting the mark, having sufficient power to excite the mark and provide a fluorescent signal the mark from a; a signal detector for detecting the fluorescent signal from the mark; a and power modulator means for varying the power if the excitation source between zero and the maximum power level to produce a decodable fluorescent signal from the mark disposed on the background. A process for decoding an invisible mark having a near infrared fluorescing material includes the steps of: providing at least one invisible, near infrared fluorescing mark disposed on at least one portion of a background; exciting the mark with a laser having a maximum power level sufficient to provide a fluorescent signal from the mark; detecting the fluorescent signal and concurrently varying the power of the laser between zero and its maximum power, to obtain a decodable fluorescent signal.

39 Claims, 13 Drawing Sheets

SCANNERS FOR READING NEAR INFRARED FLUORESCENT MARKS

RELATED APPLICATION

This application is based upon and claims the priority of provisional application Ser. No. 60/020,308 filed Jun. 24, 1996.

FIELD OF THE INVENTION

This invention relates generally to automated identification methods. More particularly, it relates to the reading of marks, invisible to the naked eye, on documents or other articles whose subsequent identification for purposes of tracking, sorting, process control maintenance, authenticity verification, and the like is desired. This invention is especially related to an improved scanning apparatus and process that enables the detection of fluorescent light emanating from particular infrared fluorescing compounds against backgrounds of varying optical density.

BACKGROUND OF THE INVENTION

For reasons of security, increased information density, or aesthetics, a mark that is invisible to the eye and can be applied anywhere on the surface of a document or other article without masking or obscuring in any way the underlying background would be highly desirable. Of course, conventional visible mark scanners that rely on variations in light intensity reflected back from the surface of a substrate are unable to detect such an invisible mark.

U.S. Pat. No. 4,540,595 discloses methods for marking substrates with inks containing a fluorescent component that emits light in or close to the infrared region, the fluorescent emission being employed for signal processing in place of conventional reflected light. Use of compounds that fluoresce in the near infrared (NIR) region, i.e., in the range of about 700 nm to 1100 nm, are noted to be particularly attractive since there is little background interference compared to the UV region where many common compounds absorb and fluoresce, which makes possible improved signal to noise ratios. However, the compounds that are specifically disclosed in the reference lose their fluorescent capability too quickly to be practically useful.

Ideally, suitable fluorescent components would display Stokes shifts, defined as the difference between peak absorbance and peak fluorescence, that are large, preferably in the range of 40 to 60 nm. Stokes shifts of this magnitude would greatly simplify the optical filtration requirements needed to operate a scanning system and provide adequate fluorescent light signal for further processing. Unfortunately, fluorescent compounds with desirable Stokes shifts and fluorescent capabilities are not presently available.

Yet another problem is that fluorescent light intensity is attenuated in a nonlinear fashion with respect to the darkness of the underlying background. U.S. Pat. No. 4,983,817 discloses an approach to compensating for this problem that entails adding an additional detector to simultaneously measure the background reflectance light. An electronic, nonlinear algorithm is applied to the reflectance signal as a means of providing background compensation for the separately detected, fluorescent signal. This technique reportedly results in a constant amplitude signal being generated for subsequent electronic processing. Although this system is purported to work well with inks with ideal optical characteristics, i.e., having large Stokes shifts, the dyes claimed in the reference have very short lifetimes, which renders them impractical for many applications. NIR fluorophores with longer lifetimes are disclosed in U.S. Pat. Nos. 5,292,855 and 5,366,714, but these dyes do not have the large Stokes shifts needed for the operation of the scanning system described. Thus, less than ideal optical filtration constraints are imposed on the system, resulting in high loss levels of the fluorescent light. The aforementioned systems therefore do not successfully decode these longer-lived invisible marks over underlying backgrounds of widely varying densities.

SUMMARY OF THE INVENTION

In accordance with the present invention, an apparatus for detecting an invisible, near infrared fluorescing mark disposed on a background comprises: an excitation source for exciting the mark, the source having sufficient power to provide a fluorescent signal from a mark situated on a least reflective portion of the background; signal detecting means for detecting the fluorescent signal from the mark; and power modulating means for varying the power between zero and the maximal power level of the excitation source, which is preferably a laser, in a manner effective to produce a decodable fluorescent signal from a mark disposed on any portion of the background.

In a preferred embodiment of the apparatus of the invention, the laser excitation source has a maximal power level of at least about 10 mW and is a red or near infrared (NIR) emitting diode laser, more preferably, a pulsable laser. The signal detecting means is a first detector, which detects the fluorescent signal from the mark and may further detect a portion of the light reflected from the background. In other embodiments, the apparatus further comprises a second detector and a second excitation source.

The power modulating means preferably comprises an electronic circuit that provides a square wave voltage signal that serves as an on/off switch to vary the average power output of the laser substantially linearly between zero and its maximal power. The electronic circuit preferably provides steps through preset average power levels of the laser.

In another embodiment of the apparatus of the invention, the power modulating means comprises a voltage detector circuit for detecting a signal from the second detector; the voltage detector circuit operates to vary the power of the laser from zero to its maximal level to maintain the signal from the second detector at a substantially constant level, thereby producing a decodable fluorescent signal from the invisible mark. The apparatus of the invention may further include a polarizer and/or an instrumentation amplifier circuit to improve the decodability of the fluorescent signal from the mark.

A process of the invention for decoding an invisible mark comprising a near infrared fluorescing material comprises: providing at least one invisible, near infrared fluorescing mark disposed on at least one portion of a background; exciting the mark with a laser having a maximal power level sufficient to provide a fluorescent signal from the mark when it is disposed on a least reflective portion of the background; and detecting the fluorescent signal and concurrently varying the power of the laser between zero and its maximal power in such manner to produce a decodable fluorescent signal from a mark disposed on any portion of the background.

Further in accordance with the present invention is an invisible marking system having improved decodability and a process for enhancing the decodability of an invisible fluorescent mark. The process comprises: providing at least one invisible mark comprising a near infrared (NIR) fluorescing material on a background comprising a uniformly distributed, invisible, near infrared (NIR) absorbing material; and irradiating the fluorescing mark and the background comprising the near infrared (NIR) absorbing material with a laser that preferably emits in the red or near infrared (NIR) region, thereby producing a fluorescent signal from the mark. The fluorescent signal has enhanced decodability resulting from absorption of radiation from the laser by the background.

DETAILED DESCRIPTION OF THE INVENTION

Figure 1:
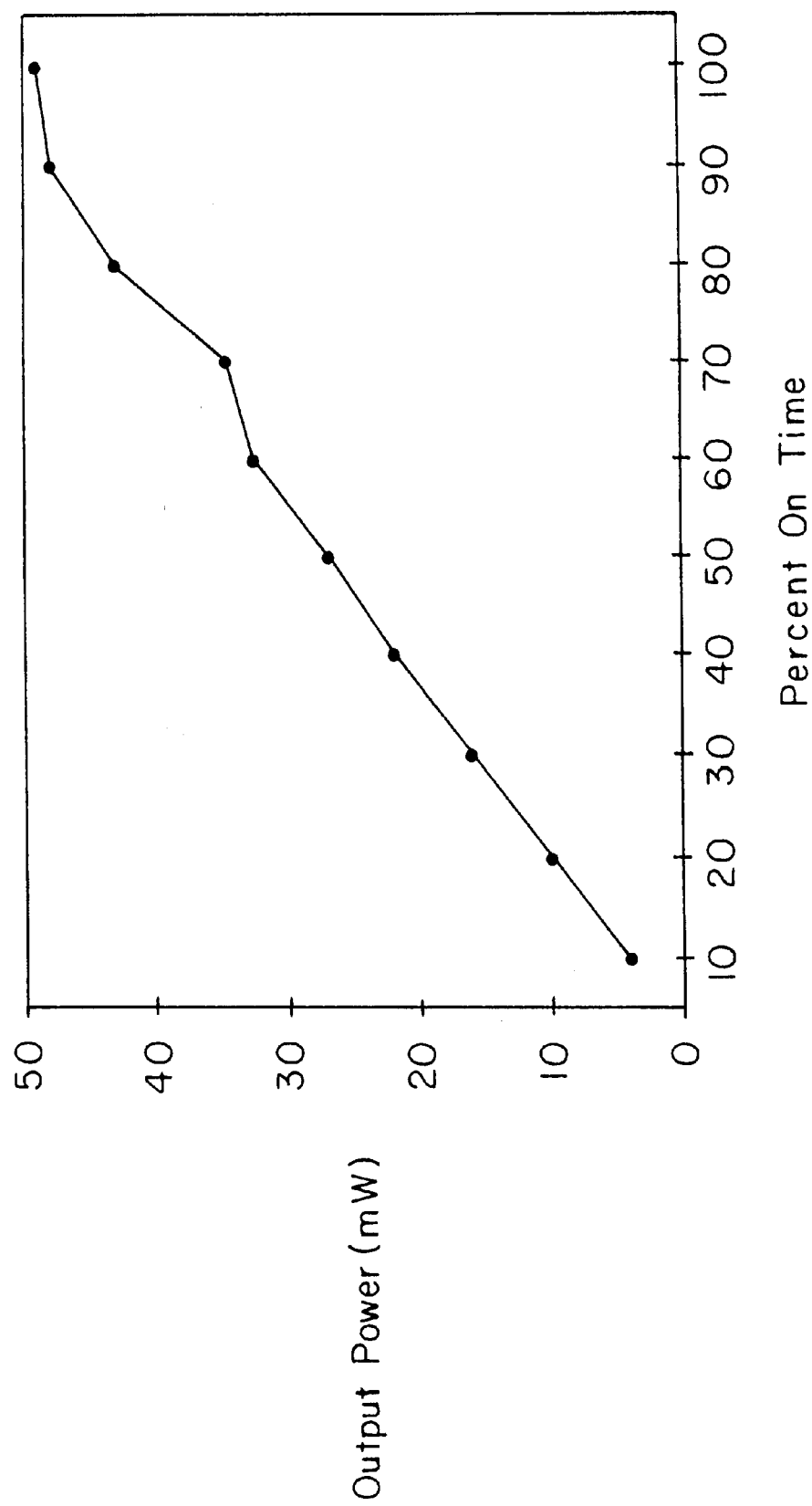
FIG. 1 is a graph of power output vs duty cycle of a pulsable laser.

Fundamental to the present invention is the need to optimize the fluorescent signal from the mark by compensating for the background, which may be of widely varying reflectance. Mechanistically, a dark underlying background may reduce the fluorescence intensity by absorbing the incident excitation light before fluorophore excitation, or by absorbing some portion of the emitted light, or both in combination. Lighter backgrounds reflect more of the excitation light, which may result in higher noise levels, particularly in systems with dyes that have relatively small Stokes shifts, i.e., in the range of 5 to 10 nm. Optical filters selected to remove as much of the reflected light as possible inherently remove a substantial amount of the fluorescent light as well.

There are several general methods for increasing the amount of fluorescent light collected by the detector. One is to increase the power and/or spectral bandwidth of the excitation source. Another method is to improve the optics of the system to collect as much as possible of the fluorescent light in its purest form. This may be achieved by, for example, including an optical device such as a polarizer in addition to suitable filters, or by electronic circuitry that effectively subtracts other signals from the fluorescence. All of these proposed methods involve modifications to the scanner itself.

Another approach, which does not involve the scanner directly, involves modification of the surface from which the fluorescent light emanates by increasing the concentration of fluorescent compound in the mark or by adding a second compound that either reduces the amount of reflectance through nonradiative absorption or provides a second signal for background compensation. It should be noted, however, that there is a practical upper limit to increasing the concentration of fluorophore since too high a level will impart visible color, thereby rendering the mark visible. Each of these approaches is individually described below.

Single Excitation Source Modifications

As noted above, one approach to increasing the amount of fluorescent light, particularly for situations in which there is a dark underlying background or the Stokes shift of the mark is small, is to increase the power of the excitation source, which is preferably a laser. In general, a 5 milliwatt (mW) laser is used as the power source in a scanner designed to read visible marks such as bar codes. However, detectors with conventionally sized lasers often do not provide adequate fluorescence excitation, especially over dark or varying dark/light backgrounds. Medium powered lasers, about 10 to about 20 mW, may be used as excitation sources for mostly white or light colored backgrounds and for marks having relatively large Stokes shifts in the 40 to 60 nm range. Applicants have found, however, that higher powered lasers, preferably those greater than about 20 mW, more preferably, from about 30 to about 70 mW are advantageously used as excitation sources for near infrared fluorescent marks of relatively low Stokes shifts, especially on dark backgrounds or backgrounds of varying color. Lasers of suitable power levels are readily available from a variety of manufacturers.

Once an excitation source with a given maximal power level is selected, performance of the excitation source can be further improved by varying its power level, which increases the likelihood of signals readable by the detector, with at least one signal being optimum for accurate detection. Changing the power level can be accomplished in a relative manner by electronically generating a square wave voltage signal that serves as an on/off switch for a pulsable laser, resulting in a duty cycle with controlled variability. Changing the duty cycle from 0 through 100 percent causes the power output of the laser to vary in a substantially linear fashion from zero to its maximum. This is illustrated in FIG. 1, which is a graph of power output vs duty cycle for a 50 mW 789 nm diode laser (model PMT50/1971, from Power Technology, Inc., Little Rock, Ark.).

Figure 2A:
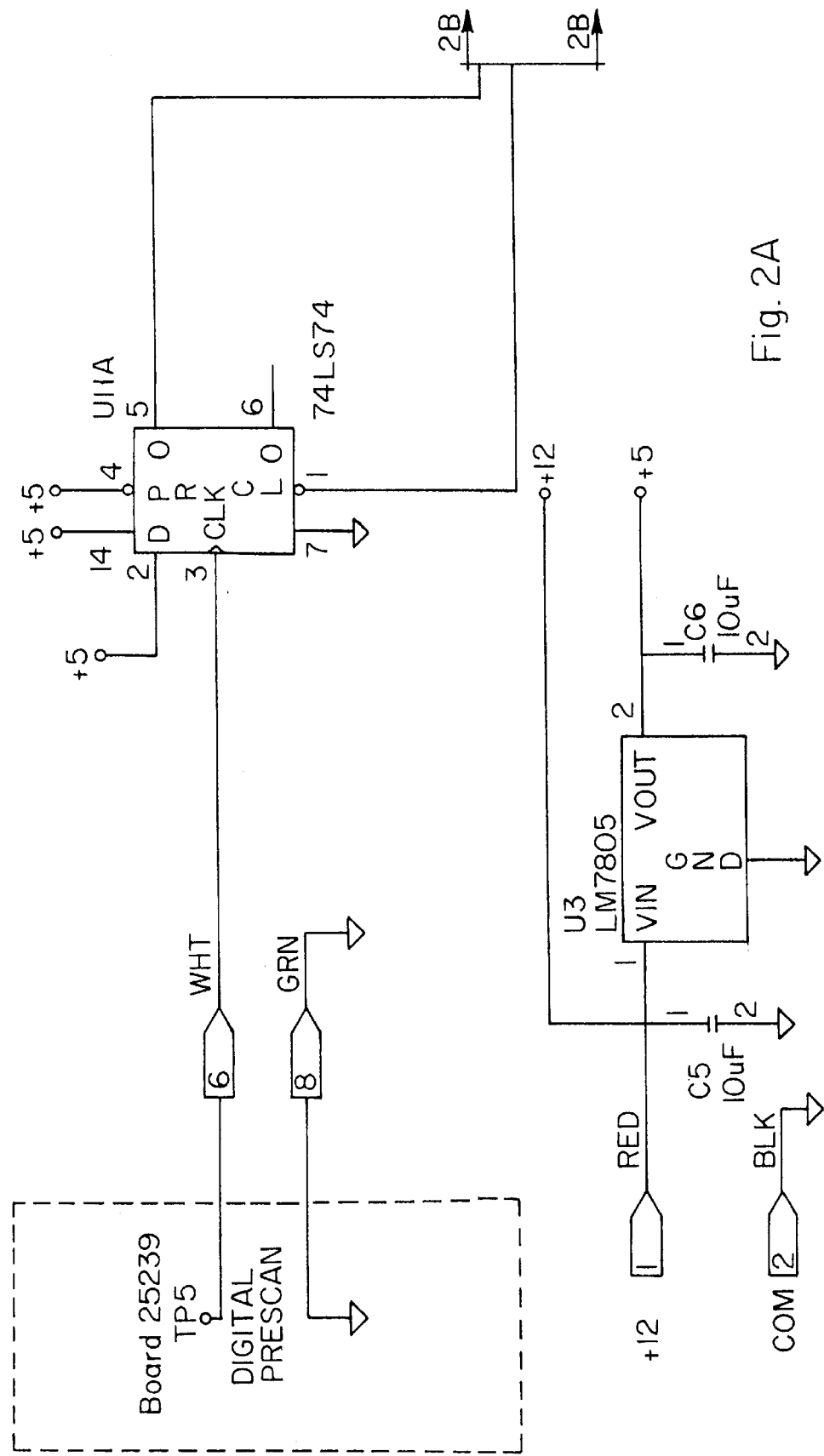
FIG. 2 is a schematic representation of an electronic circuit for adjusting the duty cycle of a pulsable laser.
Figure 2B:
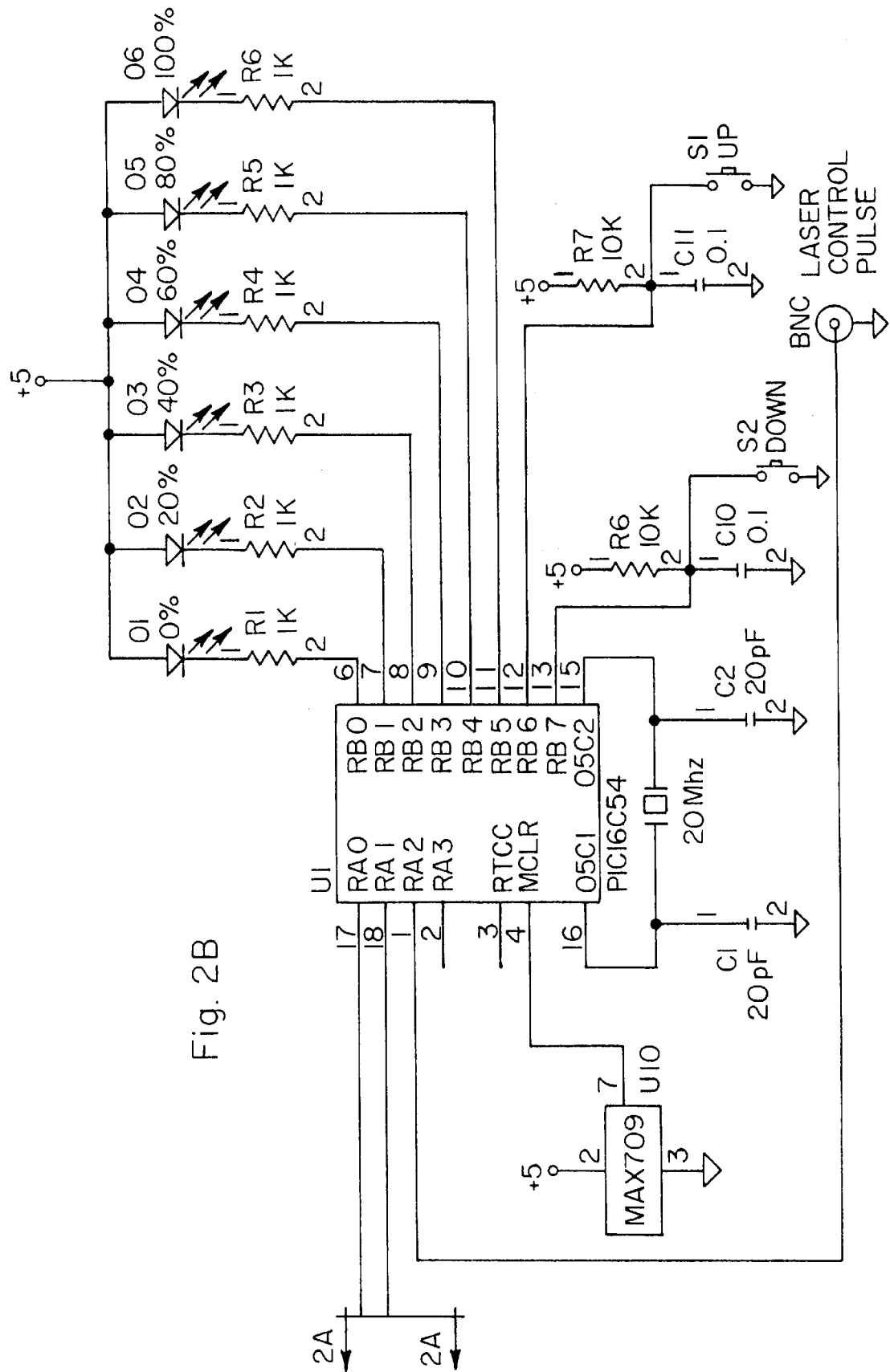

Preferably, a controlling circuit that steps through preset average power levels such as, for example, 20, 40, 60, 80, and 100 percent before repeating is used to vary the power level. FIG. 2 is a schematic diagram of a circuit that has been incorporated into an Accu-Sort Model 55 Scanner, previously modified to detect near infrared (NIR) fluorescent bar code signals, to scan a 50 mW 789 nm diode laser through preset average power levels of 20, 40, 60, 80, and 100 percent produced by appropriate adjustment of the duty cycle. For example, for a laser operating at 50 mW on, 0 off, and pulsed at 1 MHz (1 $\mu$s), adjusting the duty cycle to 0.2 $\mu$s on, 0.8 $\mu$s off, produces a 20 percent power level, or 10 mW. Similarly, adjustment to 0.4 As on, 0.6 $\mu$s off, produces a 40 percent power level, or 20 mW, etc. Suitable pulsable lasers are commercially available from a number of manufacturers, including Power Technology, Inc., Little Rock, Ark.

Figure 3A:
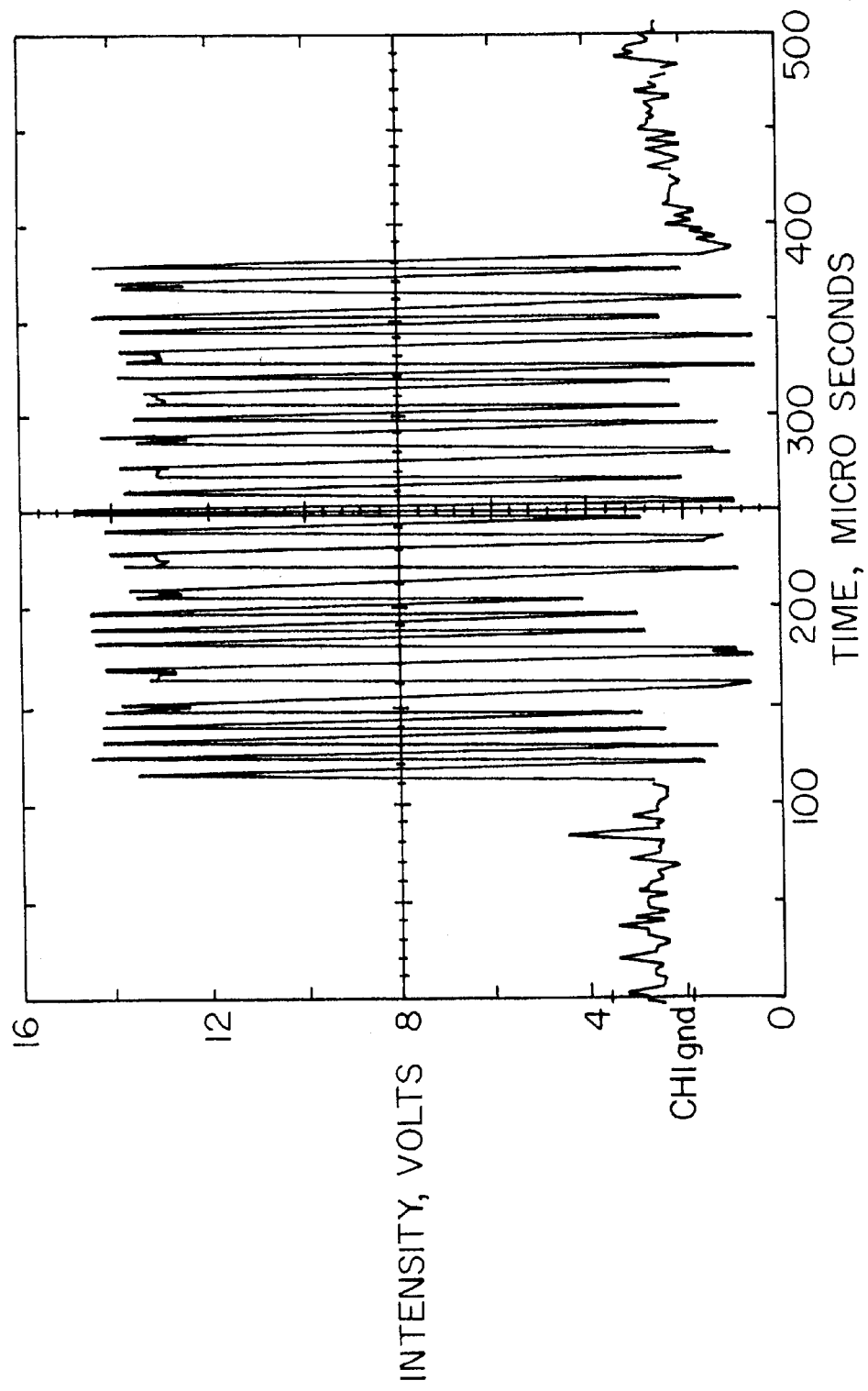
FIGS. 3A–3D are oscilloscope traces of bar code signals under various background and laser power level conditions.
Figure 3B:
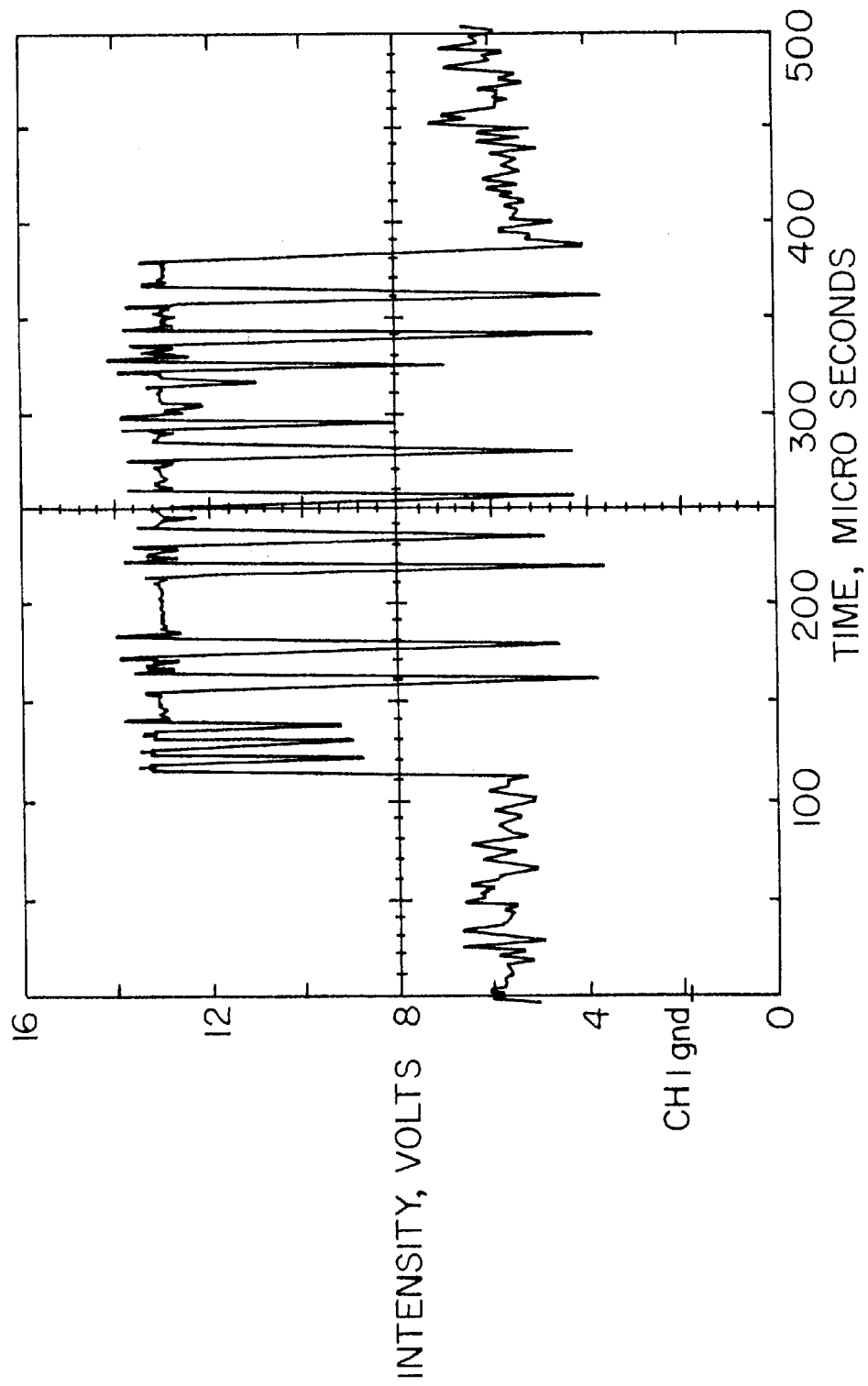
Figure 3C:
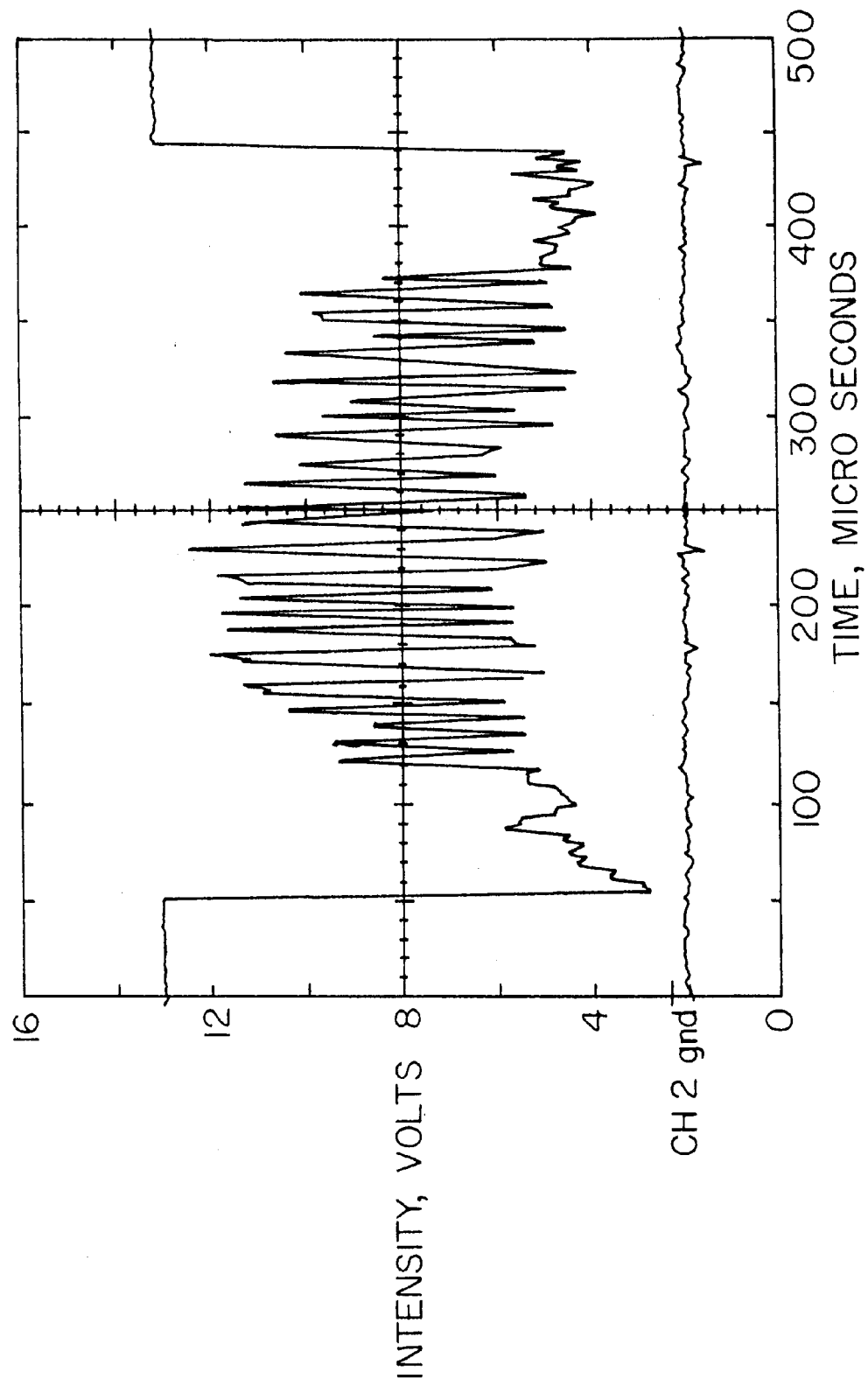
Figure 3D:
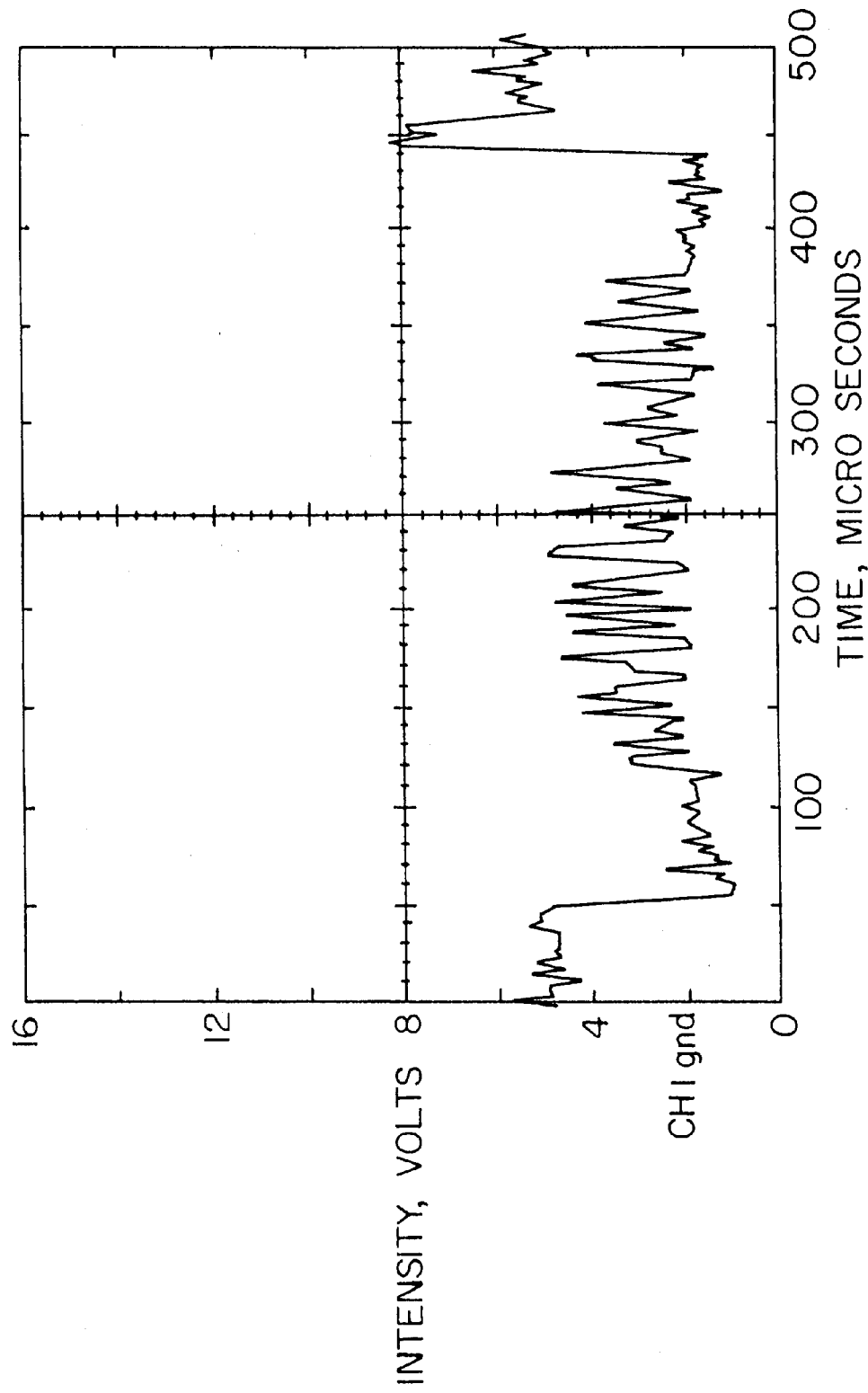

By stepping through the various power levels, at least one setting provides enough power for acceptable fluorescence detection with the least amount of reflectance to allow the mark to be decoded. FIGS. 3A–3D are oscilloscope traces of bar code signals under various background levels and laser power level conditions, using the previously described scanner and pulsed laser. FIG. 3A is a trace for the bar code signal on a 5 percent black substrate scanned with the laser at 20 percent power; the signal is easily decoded. FIG. 3B shows the trace on a 5 percent black substrate but at 40 percent laser power. Because the signal is saturated in several places, it cannot be decoded at this or at any higher power level. FIG. 3C contains the bar code signal trace on a 90 percent black substrate with the laser at the 100 percent power level. Under these conditions, the bar code is decodable. However, when the bar code on a 90 percent black substrate is scanned with the laser power level at only 40 percent, the bar code is not decodable.

Thus, the same detector can read over light backgrounds at low power settings, thereby minimizing interference from reflectance, and also read over dark backgrounds at the high power settings required for generation of sufficient signal for detection.

Typically, a scanner operating with the stepped laser will go over the mark to be read at each of the preset power levels. Scans that generate either too little fluorescence from insufficient excitation on a dark background or too much fluorescent and/or reflected light from excessive excitation over a white or lightly colored background cannot be decoded by the detector and the associated decoding electronics comprising the scanner. Generally, more than one scan, preferably at least 3, more preferably, between about 3 and 8 scans are taken at each power level. This multiple scanning can be achieved by use of a multifaceted mirror wheel or a vibrating mirror. Even with several scans at each level, the total scan time for a sample comprising a substrate containing an invisible mark remains substantially less than one second. Preferably, samples are scanned at a rate of at least about 5 samples per second.

Alternatively, the modulation of the power of the laser can be controlled by employing a second detector set to collect substantially only reflected light. The reflected light signal, which is used to control the power levels of the excitation laser, is fed into a voltage detector that operates to modulate the power from the excitation laser. FIG. 4A schematically represents such a non-inverting voltage detector circuit. $E_i$ is the signal from the reflected light detector; $V_o$ turns the laser off and on (high $V_o$ is off, low $V_o$ is on). The variable resistors nR and mR provide independent control of the center voltage and hysteresis, respectively.

Figure 4B:
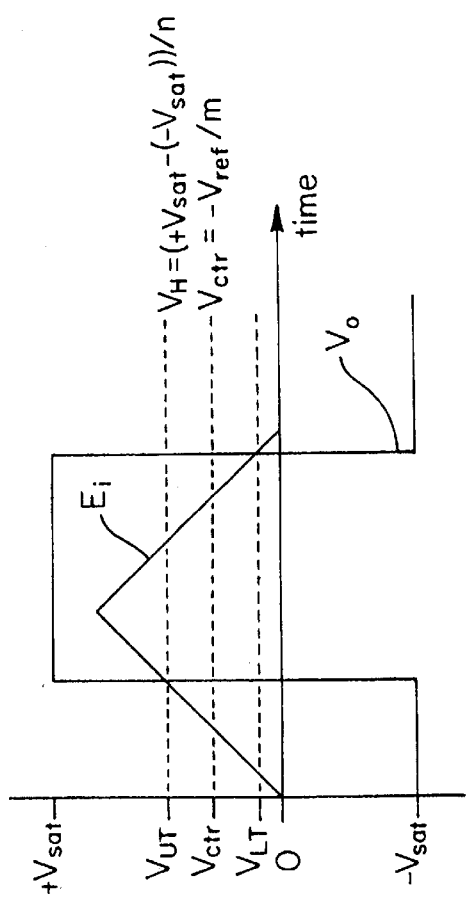
FIG. 4B graphically depicts the output voltage as a function of the input signal.
Figure 4A:
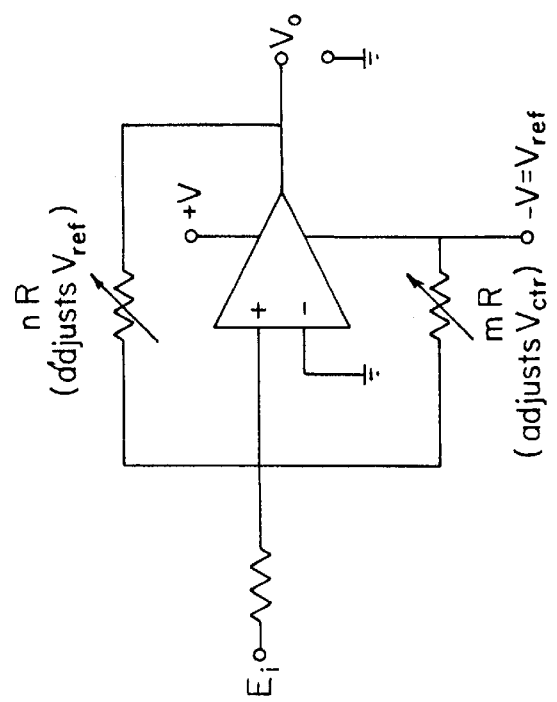
FIG. 4A is a schematic representation of a voltage level detector circuit for controlling the power output of a laser excitation source.

The output voltage as a function of the input signal for the described circuit is graphically depicted in FIG. 4B. This circuit thus operates as a feedback loop to control the power output of the laser and thereby maintain a substantially constant level of collected reflected light signal. Consequently, more power can be delivered from the laser as needed, for example, when the background is or becomes dark. This embodiment is especially useful for reading marks that are printed over substrates with very high contrast backgrounds because the modulated feedback allows for "on the fly" optimization across a highly contrasted background, i.e., the excitation source would generate the optimum power for each part of the mark to be read.

Figure 5:
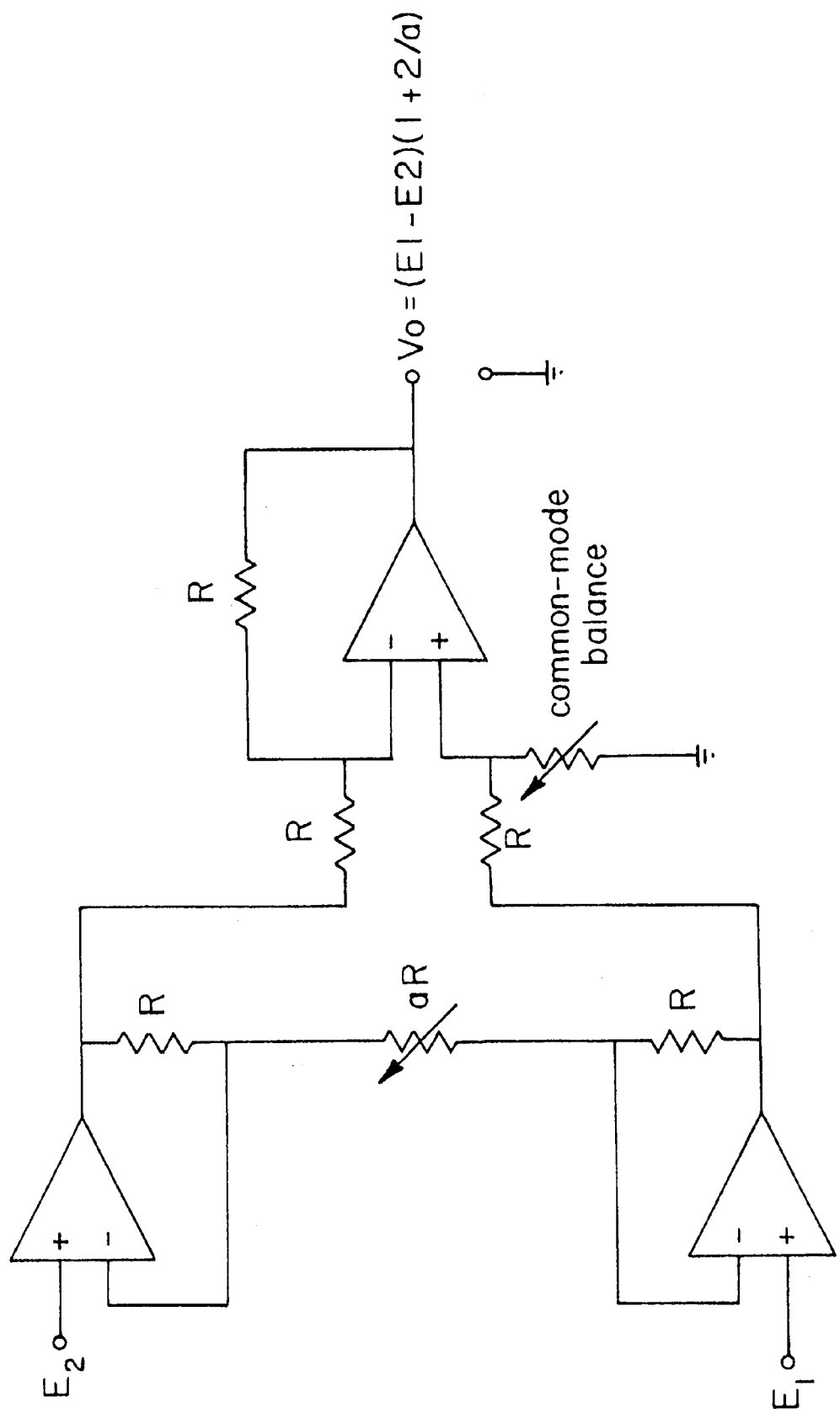
FIG. 5 schematically represents a circuit for amplifying the difference between signals from two detectors.

An approach to improving detection of the fluorescent signal from the invisible mark, particularly when the Stokes shift of the selected fluorophore is small and the fluorescent signal intensity is dwarfed by the reflected signal, makes use of an instrumentation amplifier circuit, as schematically depicted in FIG. 5. In this embodiment, the scanner is set up such that approximately equal amounts of reflected light intensity are collected by two detectors: a reflectance detector that includes a bandpass filter centered around the reflected light wavelength, and a fluorescence detector provided with a slightly broader bandpass filter to collect both reflected and fluorescent light. The separate signals, $E_1$ from the detector receiving only reflected light and $E_2$ from the detector receiving both reflected and fluorescent light, are fed into the amplifier circuit, which cancels out the reflected light signal and amplifies the fluorescent signal. Thus, the output $V_o$ from the amplifier circuit is an amplified fluorescent signal that can be fed to an associated bar code decoding circuit. Amplifier circuits of the type described are known and are described in, for example, R. F. Coughlin and F. F. Driscall, *Operational Amplifiers and Linear Integrated Circuits*, Prentice Hall Inc., Englewood Cliffs N.J., 1982.

Figure 6:
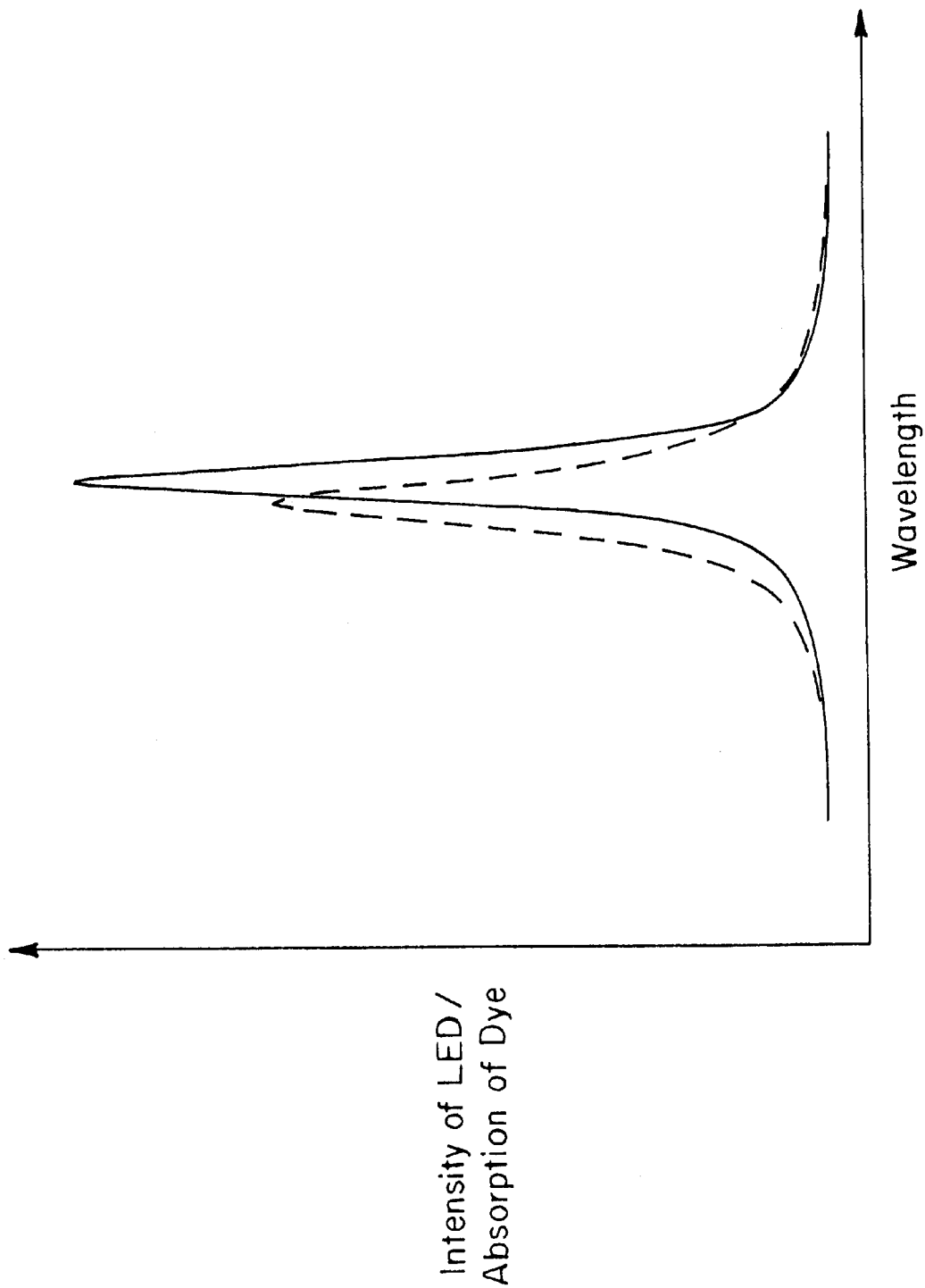
FIG. 6 is a plot comparing the absorption curve of a fluorescing dye and the emission curve of a light emitting diode.

A second option for increasing fluorescence for scanners with only one detector is to replace a laser excitation source with a suitably powered light emitting diode (LED) having a broad spectral bandwidth that is slightly offset hyposchromically from the area of highest absorbance by the fluorophore, as shown in FIG. 6. Suitable power levels are similar to those disclosed for a laser and can be readily determined by one skilled in the art using the teachings of this invention. Selection of an appropriate optical filter between excitation and emission provides adequate fluorescent intensity with minimal reflected light noise.

Additionally, several other modifications may be optionally made to other portions of the scanner to further increase the efficiency of the excitation source. For example, a polarizer may be added to the optical train leading to the detector. Although a polarizer will attenuate both the fluorescent and reflected light intensity, the reflected light is reduced to a greater degree because it is polarized to an appreciable extent by the laser. The less attenuated, essentially non-polarized fluorescent light thus provides a strong signal with adequate excitation power.

The substrate providing the background for the mark can also be modified to reduce the absorbance/reflectance variability of the background and thereby increase decodability of the mark. This approach, illustrated in FIG. 7, entails application of a uniform layer of a substantially colorless, NIR absorbing coating to the substrate surface before the NIR fluorescing bar code marking is applied. This uniform coating contains a material that is absorptive of the excitation light but is nonluminescent, i.e., nonfluorescing. For example, a nonfluorescing metal phthalocyanine or naphthalocyanine dye can be formulated into an ink or coating and applied to the substrate surface as a transparent layer over which the fluorescent marking is printed. Suitable absorbing dyes do not fluoresce substantially in the same range as the near IR fluorescing dye and are well known in the art. Preferably absorbing dyes are paramagnetic, such as those having a nucleus linked by a metallic atom such as, but not limited to Cu, Ni, Co, VO and Fe. Suitable absorbing dyes include both phthalocyanine and naphthalocyanine type compounds such as those disclosed in Topics in Applied Chemistry. Infrared Absorbing Dyes ed. Masareu Matsuoka, Pleum Press, N.Y. p 58, U.S. Pat. Nos. 4,606,859, 5,359,056, 4,769,307 and 5,034,309. The absorbing dye attenuates some of the reflected light by absorbing light that has not been absorbed by the fluorophore.

In a related approach, a uniform, invisible coating containing a fluorescing material is applied to the surface of the substrate providing the background for the NIR fluorescing mark. The use of a fluorescing dye for the uniform coating has the advantage over a nonfluorescing material in requiring a much lower laydown concentration for effectively enhancing decodability of a mark. The fluorescence from this uniformly applied fluorophore varies with the reflectance of the underlying substrate in substantially the same manner as the fluorescence from the dye with which the NIR mark is applied. The signal from the second fluorescent dye can therefore be used to compensate for background dependent variations in the signal from the NIR mark. This second fluorescent dye needs to fluoresce at a substantially different wavelength from that used to form the NIR mark and may, but not necessarily, require excitation by a second NIR light source emitting near the absorption maximum of the second dye. For example, a unique invisible mark which may code certain information, such as, but not limited to a bar code can be printed using an aluminum phthalocyanine dye, which absorbs near 680 nm and fluoresces at somewhat longer wavelengths, on an area already coated with a silicon naphthalocyanine dye, which absorbs at 780 nm and fluoresces at wavelengths longer than 780 nm. Both dyes are scanned simultaneously with collinear 680 nm and 780 nm lasers and their fluorescent signals collected on two separate detectors, as will be further discussed below. The variation in the signal from the silicon naphthalocyanine, which would be constant in the absence of variations in the background, is then used to correct the signal from the aluminum phthalocyanine for the substrate variations. In this manner, a bar code signal essentially free from background dependent variations can be obtained.

Double Excitation Source Modifications

Figure 8:
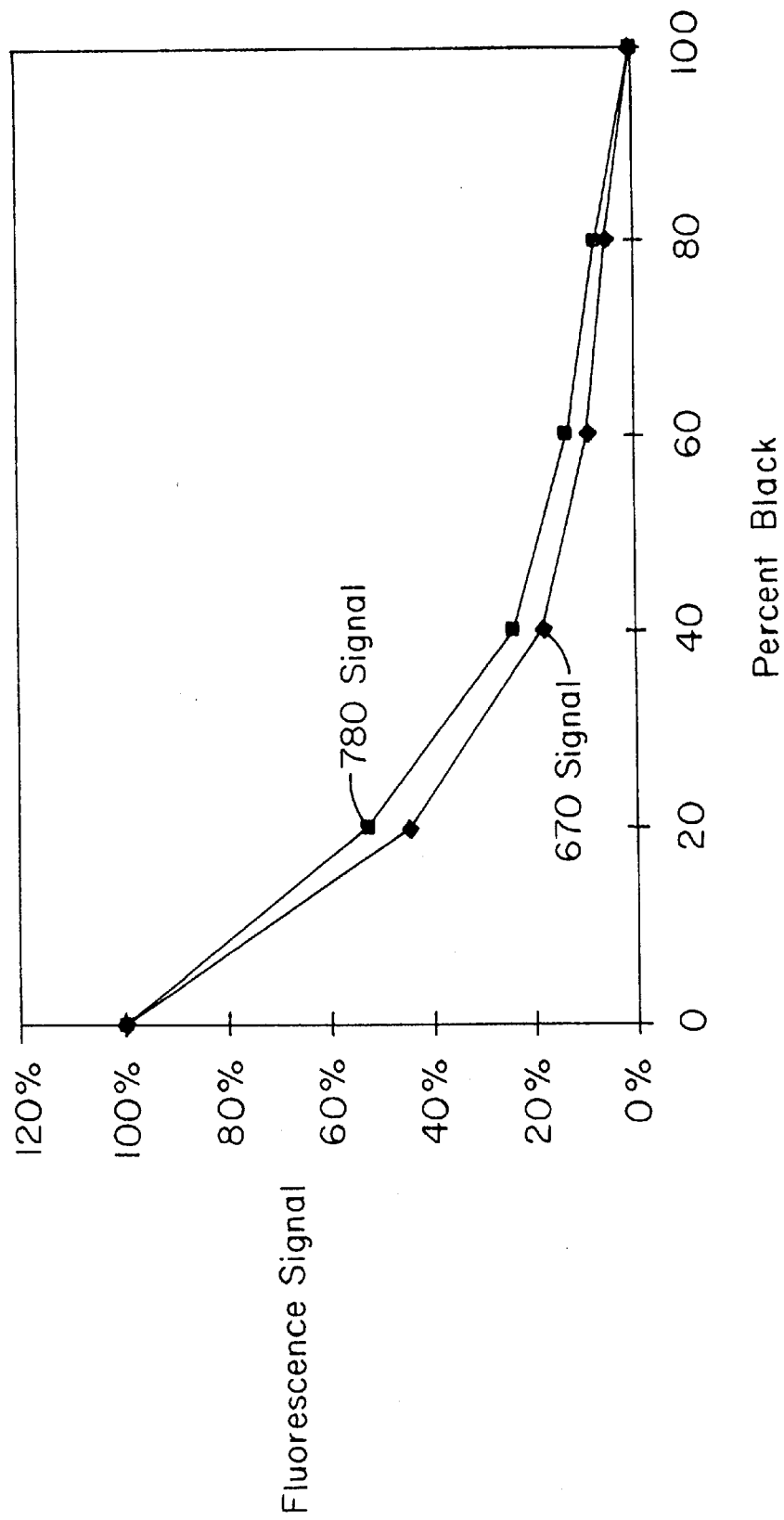
FIG. 8 is a graph comparing the effect of background darkness on two fluorescent signals of differing wavelength.

Addition of a second detector with optics that split the collected light into desired bandwidths enables other modifications to a conventional scanner to enable it to read NIR fluorescent markings. In such a system, the marking carrier comprises two separate NIR fluorophores that are stimulated at different wavelengths. One of the NIR fluorophores uniformly either covers or underlies at least a strip of the area of a bar code provided with the second fluorescer. The scanner comprises two excitation sources having distinct wavelengths to stimulate both fluorophores. The optics of the system measure the fluorescence of each fluorophore independently, and the scanner compares the signals from the two fluorophores. Because the background affects the fluorescent signals from the two fluorophores similarly, as shown in FIG. 8, the scanner compensates for background variations when the ratio of the signals is obtained. It should be understood that the approaches described in the section "Single Excitation Source Modifications", i.e., higher power and stepped or modulated excitation, can also be used in coordination with one or both of the dual excitation sources described in this section.

Figure 9:
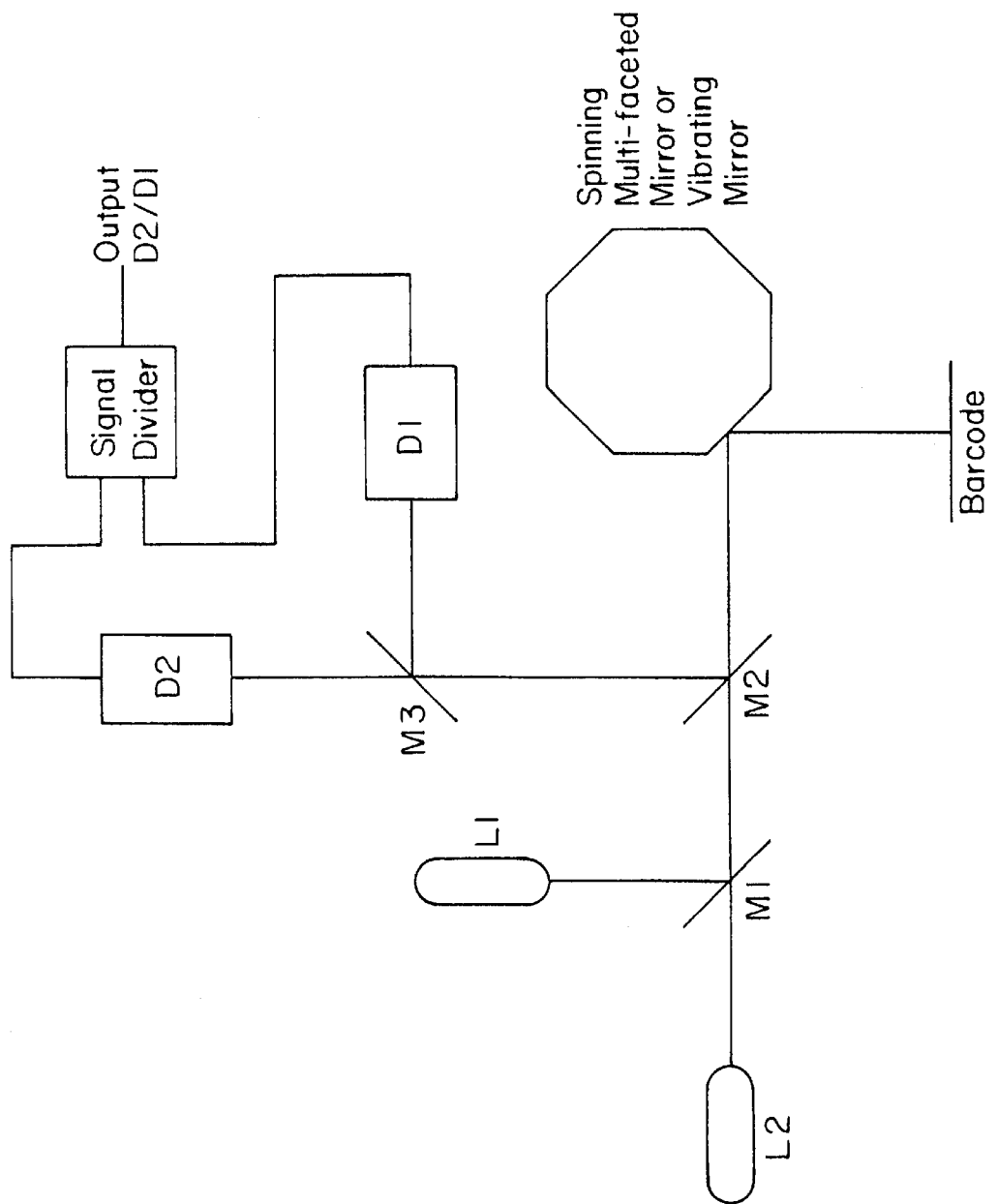
FIG. 9 is a schematic representation of a bar code scanner provided with two light sources.

The scanner for reading such bar codes is depicted in FIG. 9. It has two light sources, L1 and L2, which are preferably diode lasers, for exciting the fluorescence in ink 1 and ink 2, respectively. Light beams from the two sources are superimposed by mirror M1, pass through a hole in mirror M2, and are then scanned across the bar code by a spinning or vibrating mirror. Fluorescent and scattered light from the bar code and substrate are reflected by the spinning or vibrating mirror back to M2, which directs the light to mirror M3. The light is split by mirror M3 and thereby directed to each of two detectors, D1 and D2. Detectors D1 and D2 are each optimized for detecting fluorescence from ink 1 and ink 2, respectively, each detector having incorporated within them optical filters that allow the fluorescence from each of the respective dyes to pass, while rejecting to the greatest extent possible the light from the two sources as well as the fluorescence from the other dye. The fluorescent signal from the uniform layer of invisible ink 1, detected by D1, varies with the darkness of the substrate. Such variations in the darkness of the background may be caused by text or graphics on the substrate. On light backgrounds, the signal is high; on dark backgrounds, the signal is low. The fluorescent signal from the bars of the bar code, detected by D2, varies in a similar manner with the darkness of the substrate. The signal on D2, after suitable amplification, is then divided by the signal on D1, also after suitable amplification. In this manner, the background-dependent variations in the bar code signal are greatly reduced or eliminated.

Taking the ratio of the two signals is especially important in cases where the Stokes shift of the dyes being used is relatively small. In this case, it is difficult to design an optical filtering system for the detectors in such a way that a sufficient amount of the fluorescent light passes through, while the scattered light from the source used to excite the fluorescence is substantially rejected. In most practical designs, some of the light from L1 will pass through to D1, and some light from L2 will pass to D2. The amount of light passing through varies with the darkness of the substrate. For D2, detecting the bar code signal, it is possible that the amount of stray light from a light colored area between the bars may be larger than the amount of fluorescent light received from a bar on a dark background. In such a case, it is of course impossible to decode the bar code unless corrections for the variations in background darkness are made. The correction by the signal on D1 will increase the fluorescence from a bar on a dark area relative to the stray light signal from a less dark area of the substrate. Through this correction, the bar code becomes decodable.

It should be pointed out that background correction by this method works best if the absorbance of the background is not significantly different at the wavelengths of excitation and emission for the two dyes. For the examples of inks prepared from NcSi and ortho—$(RO_2C$—$C_6H_4$—$O)_4PcH_2$, the background absorbance near 700 nm should be approximately the same as that near 800 nm.

Another possible useful combination of dyes to use for this application comprises ortho—$(RO_2C$—$C_6H_4$—$O)_4PcH_2$ and meta—$(RO_2C$—$C_6H_4$—$O)_4PcH_2$, the absorption and emission spectra of which are shifted by about 15 nm with respect to each other. Most background colors do not vary greatly over such a small wavelength range. Again, the optional filters on detectors D1 and D2 are selected so that D1 detects mainly the fluorescence from one dye and D2 detects mainly the fluorescence from the other. Since the absorption spectra for 1(4), 8(11), 15(18), 22(25)-tetra[4-(2-ethylhexyloxy carbonyl)phen-oxy]PcH$_2$ and 2(3), 9(10), 16(17), 23(24)-tetra[4(2-pentoxycarbony)phenoxy]PcH$_2$ overlap significantly, a single excitation light source can be used for both.

This method of background correction is not limited to one dimensional barcodes, but can also be applied to two dimensional symbology. In this case, light sources are provided to relatively evenly illuminate the given code, and two cameras are used to image the fluorescence from the two inks. Again, suitable optical filters are used with the cameras so that camera 1 images only the fluorescence from ink 1 and camera 2 images only the fluorescence from ink 2. The two images are then electronically processed in such a manner that the intensity variations from ink 1 are used to correct for intensity variations in the symbols printed in ink 2.

Invisible NIRF marking compounds are invisible under broad spectrum light and black light but exhibit fluorescence when activated with appropriate near infrared (NIR)light frequencies. Suitable invisible marking compounds include monomeric or copolymerized near infrared fluorescent (NIRF) compounds.

NIRF dyes useful either alone or in combination in the practice of the present invention are described in pending U.S. application Ser. No. 08/811,311, NEAR INFRARED FLUORESCENT SECURITY THERMAL TRANSFER PRINTING AND MARKING RIBBONS, filed Mar. 4, 1997, by Krutak et al., the disclosure of which is incorporated herein by reference. These dyes, which can also be employed for the synthesis of NIRF polymers useful in the practice of the invention, comprise at least one porphine composition described by the formula:

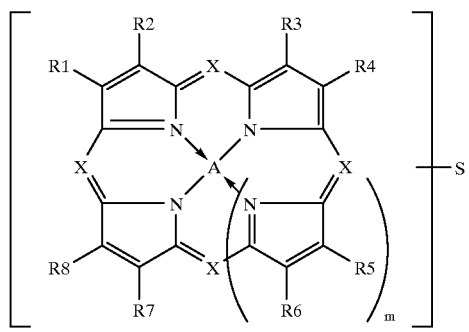

wherein each X may be the same or different and is selected from nitrogen and carbon substituted with Y, wherein Y is selected from hydrogen, $C_1$–$C_{12}$ alkyl, substituted $C_1$–$C_{12}$ alkyl, $C_1$–$C_8$ cycloalkyl, aryl and heteroaryl, m is 1 through 9; $R_1$–$R_8$ are the same or different and are selected from hydrogen, $C_1$–$C_{12}$ alkyl, substituted $C_1$–$C_{12}$ alkyl, $C_3$–$C_8$ cycloalkyl, aryl and heteroaryl, and wherein adjacent $R_1$–$R_8$ groups may represent the following parts of aromatic and heteroaromatic ring systems:

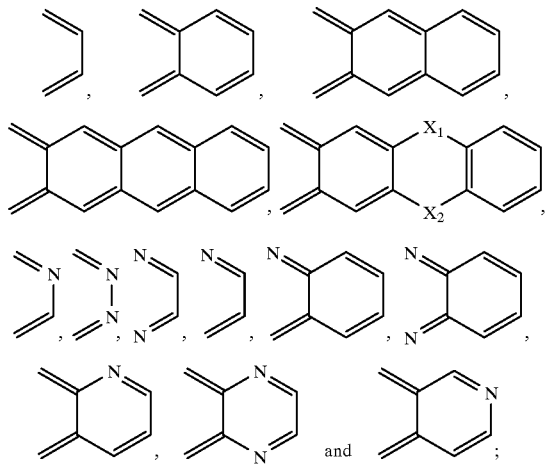

wherein A is 2(H) atoms bonded to diagonally opposite nitrogen atoms or Zn(II), Mg(II), Al(III) bonded to halogen, oxygen, sulfur or nitrogen, Sn(IV) atoms bonded to halogen, oxygen, sulfur or nitrogen, Si(IV) bonded to halogen, oxygen, sulfur or nitrogen and Ga(III) bonded to halogen, oxygen, sulfur or nitrogen and any other metal for S that produces near infrared fluorescence such as Li, Na, K, Be, Mg, Ca, Sc, Y, La, Ac, Ti, Zr, Hf, Cr, Mo, W, Mn, Tc, Re, Fe, Ru, Os, Co, Rh, Ir, Ni, Pd, Pt, Cu, Ag, Au, Zn, Cd, Hg, In, Tl, Ge, Pb, As, Sb; lanthanides: Pr, Nd, Sm, Eu, Gd, Dy, Ho, Er, Tm, Yb, Lu; and actinides: Th, Pa, U, Np; and S represents 1–8 substituents bearing polymer forming reactive groups, i.e., capable of producing a polymer, which may be substituted into Y or the $R_1$–$R_8$ groups or both.

In the case of the $R_1$–$R_8$ groups and Y, any nuclear position that produces the desired light absorption and fluorescence properties can be used. The scope of the $R_1$–$R_8$ groups includes symmetric and less symmetric combination of ring systems designed to increase the absorption wavelengths. By designing the NIRFs with higher absorption wavelengths, the color of the resultant compound is minimized.

Preferably X is 0, 2 or 4 nitrogens, more preferably 2 (diazaporphines), most preferably 4 nitrogens (tetraazaporphines). Examples of suitable tetraazaporphines include, but are not limited to:

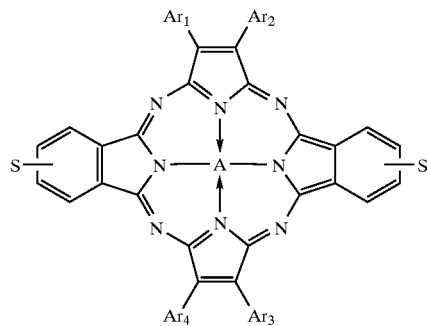

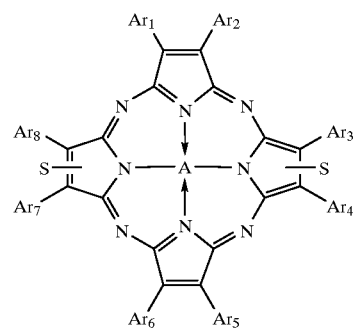

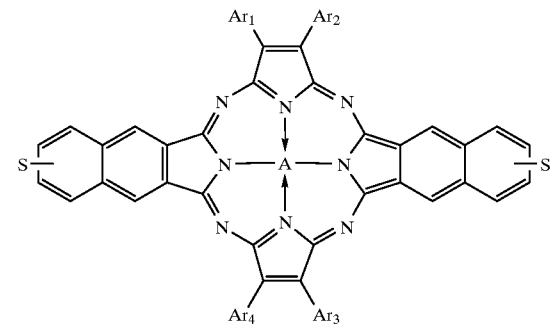

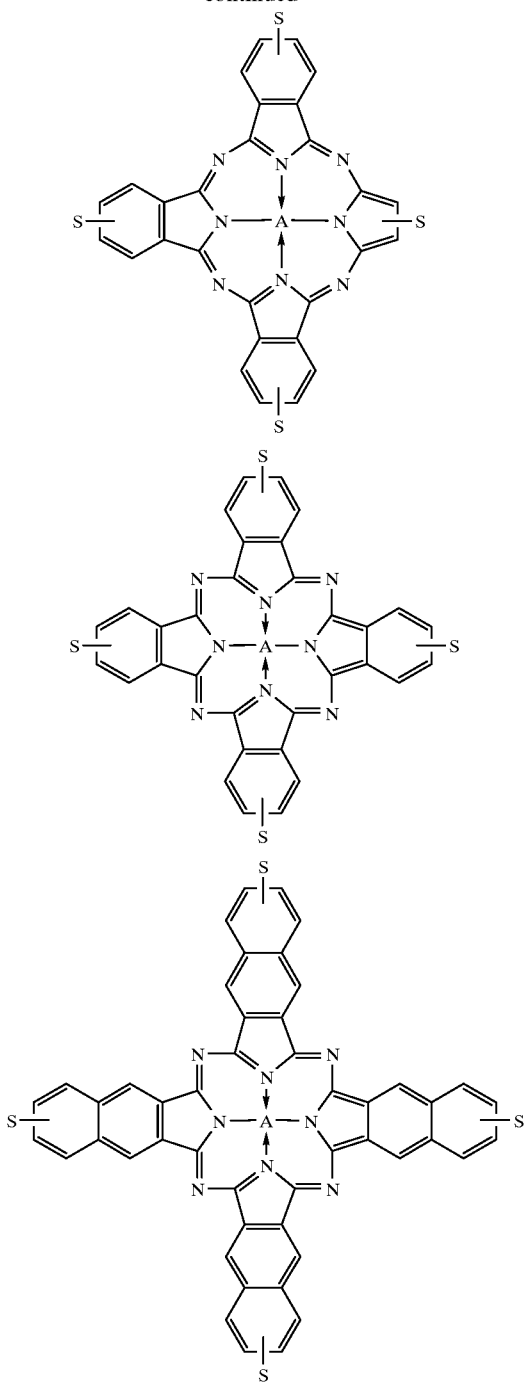

and Si bonded to nitrogen and halogen, oxygen, or sulfur, or 2 (H) atoms bonded to diagonally opposite nitrogen atoms. Other suitable NIRFs are disclosed in U.S. Pat. Nos. 5,397,819 and 5,416,136, the disclosures of which are incorporated herein by reference.

As described above, S is or contains the polymer forming reactive group, which provides the NIRF with its copolymerizability or reactivity to the polymer backbone. Suitable reactive groups vary depending upon the backbone polymer that is selected. Examples of such S groups include, but are not limited to: O—arylene—CH=CH$_2$, O—C$_1$-C$_{12}$—alkylenearylene—CH=CH$_2$, O—CH$_2$CH=CH$_2$, O—C$_1$-C$_{12}$—alkylene—CO$_2$CH=CH$_2$, O—C$_1$-C$_{12}$—alkylene—CO$_2$C(CH$_3$)=CH$_2$, O—C$_1$-C$_{12}$—alkylene—OCOC(CH$_3$)=CH$_2$, C$_1$-C$_{12}$—alkylenearylene—CH=CH$_2$, NH—arylene—C$_1$-C$_{12}$—alkylene—CO$_2$CH=CH$_2$, OCO—C$_1$-C$_{12}$—alkyl, NHCOCH=CH$_2$, C$_1$-C$_{12}$—alkylene—NHCOCH=CH$_2$, NH—arylene—NHCOCH=CH$_2$, Z—C$_1$-C$_{12}$—alkylene—I, Z—arylene—CHO, Z—CH$_2$CH(O)CH$_2$, NH$_2$, Z—arylene—CH(O)CH$_2$, Z—arylene—NH$_2$, Z—C$_1$-C$_{12}$—alkylene—NH$_2$, OCOCH=CH$_2$, OCOC(CH$_3$)C=CH$_2$, CH$_2$CH(O)CH$_2$, Z—arylene—CO$_2$, C$_1$-C$_{12}$—alkylene—I, CO$_2$—C$_1$-C$_{12}$—alkylene—I, NH—C$_1$-C$_{12}$—alkyl, Z—arylene—SO$_2$CH=CH$_2$, C$_1$-C$_{12}$alkylene—Z—CH(O)CH$_2$, OCOC$_1$-C$_{12}$alkyl, SO$_2$CH=CH$_2$,

Z—C$_1$-C$_{12}$—alkylene—SO$_2$CH=CH$_2$, Z—arylene—ZCH$_2$CH(O)CH$_2$, Z—C$_1$-C$_{12}$—alkylene—OH, C$_1$-C$_{12}$—alkylene—OH, C$_1$-C$_{12}$—alkylene—COOH, Z—C$_1$-C$_{12}$—alkylene—OCO—C$_1$-C$_{12}$—OCO—C$_1$-C$_{12}$—alkyl, OH, COOH, COO—C$_1$-C$_{12}$—alkyl, Z—arylene—COOH, Z—arylene—COO—C$_1$-C$_{12}$—alkyl, SO$_2$Cl, SO$_2$F, NCO, NCS.

In the preceding list, Z is preferably selected from O, NH, N—C$_1$-C$_{12}$ alkyl, N—aryl, S, SO$_2$, Si or a direct bond.

The polymer forming reactive group may also be include in A, for example:

Al—O—arylene—CH=CH2, Al—S—arylene—CH=CH$_2$, Al—OC$_1$-C$_{12}$—alkylenearylene—CH=CH$_2$, C$_1$-C$_{12}$—alkylene—CH=CH$_2$, Al—O—phthalate, Al—O—isophthalate, Al—O—naphthalate, Si[O—arylene—CH=CH$_2$]$_2$, Al—NH—C$_1$-C$_{12}$—alkylene—CH=CH$_2$, Si[O—C$_1$-C$_{12}$—alkylenearylene—CH=CH$_2$]$_2$, Si(OH)$_2$ Si[NH—C$_1$-C$_{12}$—alkylenearylene—CH=CH$_2$]$_2$, and Si[OC$_1$-C$_{12}$—alkylenearylene—CH=CH$_2$]$_2$.

In the above definitions, the term "C$_1$-C$_{12}$—alkyl" is used to describe straight or branched chain monovalent hydrocarbon radicals containing 1–12 carbon atoms. The term "substituted C$_1$-C$_{12}$—alkyl" is used to describe C$_1$-C$_{12}$ alkyl substituted with at least one group selected from C$_1$-C$_{12}$ alkoxy, halogen, trifluoromethyl, cyano, C$_3$-C$_8$ cycloalkyl, aryl, aryloxy, arylthio, arylsulfonyl, heteroaryl, NHCOC$_1$—C$_{12}$—alkyl, NHSO$_2$—C$_1$-C$_{12}$—alkyl, NHCO—aryl, NHSO$_2$—aryl, NHCONH—C$_1$-C$_{12}$—alkyl, NHCONH—aryl, carbamoyl, sulfamoyl, SO$_2$F, CONH—C$_1$-C$_{12}$—alkyl, S—heteroaryl, CONH—aryl, SO$_2$NH—C$_1$-C$_{12}$—alkyl, SO$_2$N(C$_1$-C$_{12}$—alkyl)$_2$, CONH—C$_3$-C$_8$—cycloalkyl, SO$_2$NH—aryl, SO$_2$NH—C$_3$-C$_8$—cycloalkyl, wherein each Ar, Ar$_1$-Ar$_8$ group is independently selected from fused aryl ring systems having one to four aryl rings fused therein and preferably from 1 to 3 rings. Preferably, the Ar, Ar$_1$-Ar$_8$ groups are oriented symmetrically about the pyrrole nuclei. For example, if m is an even number, the Ar, Ar$_1$-Ar$_8$ groups may be opposite from each other or altenating in structures where m is more than 3. If m is even, the Ar, Ar$_1$-Ar$_8$ groups may be disposed in any configuration that provides the desired degree of symmetry. Preferably, the "symmetrical" Ar, Ar$_1$-Ar$_8$ groups have the same number of fused aryl rings therein. Moreover, for greatest ease of synthesis, all Ar, Ar$_1$-Ar$_8$ groups in a NIRF are the same. Preferably, A in the above general structure represents Al CON($C_1$-$C_{12}$—alkyl) aryl, $SO_2N$($C_1$-$C_{12}$—alkyl) aryl, CO—$C_1$-$C_{12}$—alkyl, CO—aryl, thiocyano, S—$C_1$-$C_{12}$—alkyl, S—aryl, $SO_2$—$C_1$-$C_{12}$—alkyl, $SO_2$—aryl, and heteroaryl.

The term "$C_1$–C12—alkylene" is used to describe straight or branched chain divalent saturated hydrocarbon radicals and those substituted with one or more groups selected from halogen, $C_1$–$_{12}$—alkoxy, $C_3$-$C_8$—cycloalkyl, and aryl.

The term "aryl" is used to describe phenyl and naphthyl radicals and these optionally substituted with halogen, $C_1$-$C_{12}$—alkoxy, $C_1$-$C_{12}$—alkyl, trifluoromethyl, cyano, $SO_2$—$C_1$-$C_{12}$—alkyl, thiocyano, hydroxy, OCO—$C_1$-$C_{12}$—alkyl, CO—$C_1$-$C_{12}$—alkyl, $CO_2$—$C_1$-$C_{12}$—alkyl, formyl, carbamoyl, sulfamoyl, $C_3$-$C_8$—cycloalkyl, NHSO2—$C_1$-$C_{12}$—alkyl, CON($C_1$-$C_{12}$—alkyl)$_2$, CONH—$C_3$-$C_8$—cycloalkyl, $SO_2NH$—$C_3$-$C_8$—cycloalkyl, $SO_2NH$—phenyl, CO—phenyl, CONH—phenyl, NHCO—$C_1$-$C_{12}$—alkyl, NHCO—$C_3$-$C_8$—cycloalkyl, S—heteroaryl, $SO_2NH$—$C_1$-$C_{12}$—alkyl, CONH—$C_1$-$C_{12}$—alkyl, $SO_2N$($C_1$-$C_{12}$—alkyl)$_2$, CON ($C_1$-$C_{12}$—alkyl)phenyl, $SO_2N$($C_1$-$C_{12}$—alkyl)phenyl, CON ($C_1$-$C_{12}$—alkyl)phenyl, $SO_2N$($C_1$-$C_{12}$—alkyl) phenyl, $SO_2$—phenyl, S—phenyl, O—phenyl, $NHSO_2$—phenyl, and NHCO—phenyl, wherein each phenyl may contain one or more substituents selected from $C_1$-$C_{12}$—alkoxy, halogen, and $C_1$-$C_{12}$—alkyl.

The term "heteroaryl" is used to represent mono or bicyclic heteroaromatic radicals containing at least one hetero atom selected from oxygen, sulfur, nitrogen, or a combination of these. Examples of suitable heteroaryl groups include: thiazolyl, benzothiazolyl, pyrazoyl, pyrrolyl, thienyl, furyl, thiadiazolyl, oxadiazolyl, benzoxazolyl, benzimidazolyl, pyridyl, pyrimidinyl, and triazolyl, and these radicals substituted with one or more of the substituents mentioned above for the term "aryl".

The term "halogen" is used to include fluorine, chlorine, bromine, and iodine.

The term "polymer forming reactive group" is used to describe a variety of reactive groups useful in making polymers and which are well-known in the art. A variety of these groups are disclosed by the examples of substituents S described above.

Specific examples of suitable NIRFs and methods for their preparation are known in the art and are described in U.S. Pat. Nos. 4,255,273; 5,292,855; 5,336,714; 5,397,819; 5,461,136; 5,525,516; 5,553,714 and 5,423,432, the disclosures of which are incorporated herein by reference.

The following examples further illustrate the invention:

Example 1—Reading bar codes against backgrounds of varying density

An Accu-Sort Model 55 scanner, available from Accu-Sort Systems, Inc., Telford Pa., is modified by installation of fluorescent detection circuitry and a pulsable 789 nm diode laser, then connected to an Accu-Sort DRX type decoding module. The laser is driven with a 1 MHz square wave TTL pulse.

A variety of standard interleaved 2 of 5 bar codes are printed using a Domino ink jet printer and an aqueous ink containing 120 ppm of silicon naphthalocyanine dihydroxide copolymerized with AQ55, a water-dispersible polyester available from Eastman Chemical Products, Kingsport Tenn. Several bar codes are printed on gray scale backgrounds varying from 30 to 100 percent black, with no part of the bar codes extending into the white areas adjacent to the black or dark areas. The laser is set at full power, and the bar codes are scanned and decoded. All barcodes are able to be read.

The duty cycle of the laser is then reduced so that the average laser power setting for the pulses is 0.4 $\mu$s on, 0.6 $\mu$s off. (Of course, in normal operation of the scanner apparatus in accordance with the invention, the duty cycle is varied through all of the preset power levels). At this setting, bar codes printed on backgrounds from 0 (white) to 70 percent black are able to be read. Finally, bar codes printed half on the dark areas of the gray scale and half on the white adjacent areas are read using the 0.4/0.6 on/off setting. Bar codes are able to be decoded when printed on up to 70 percent black. Surprisingly, this relatively simple modification provides decoding capability for marks half on the gray scale up to 70 percent of the gray level, while also providing decoding for marks that are entirely on any level of gray or entirely on white.

Example 2—Use of two detectors for bar codes on backgrounds of varying density

A sheet of paper with areas ranging from 0 to 100 percent black is coated with two near-infrared fluorescing, invisible water-based ink formulations. Ink 1 contains 120 ppm overall of silicon naphthalocyanine dihydroxide copolymerized into a water dispersible polymer, and ink 2 contains 60 ppm overall of the phthalocyanine, ortho—($RO_2CC_6$—$H_4$—$O)_4PcH_2$, also copolymerized in a water dispersible polymer. The fluorescence of the inks is measured on two detectors, each using a particular diode laser to excite the fluorescence of one of the dyes. The fluorescence from each fluorophore is collected by a lens system, passed through an optical interference filter to reject most of the scattered laser light, and then impinged onto a separate photodiode detector. The signal from each detector after amplification is measured on a voltmeter. The detector for ink 1 includes a diode laser producing light at approximately 780 nm light and an interference filter transmitting approximately 820 nm light. The detector for ink 2 comprises a diode laser emitting light at approximately 680 nm and an interference filter near 720 nm. TABLE 1 shows data for the signal levels on backgrounds of varying darkness, which are also graphically represented in FIG. 8. These data show that, although the signals on the individual detectors vary greatly with the blackness of the background, the ratio of the signals for detectors 1 and 2 on any given level of darkness remains relatively constant. Only the ratio for the 100 percent black level, for which the signal is almost zero on both detectors, is significantly different from the average ratio.

TABLE 1

| Darkness (Percent Black) | Signal on Detector 1 (Volts) | Signal on Detector 2 (Volts) | Ratio of Signals | Deviation of Ratio from Mean |
|---|---|---|---|---|
| 0% | 3.192 | 3.256 | 1.020 | −18% |
| 20% | 1.70 | 1.95 | 1.147 | −8% |
| 40% | 0.76 | 0.96 | 1.263 | 2% |
| 60% | 0.43 | 0.57 | 1.326 | 7% |
| 80% | 0.24 | 0.35 | 1.458 | 17% |
| 100% | 0.02 | 0.08 | 4.00 | 222% |
| | | Mean (100% excluded) | 1.243 | |

Example 3—Use of a second NIR fluorophore for background correction

Figure 7:
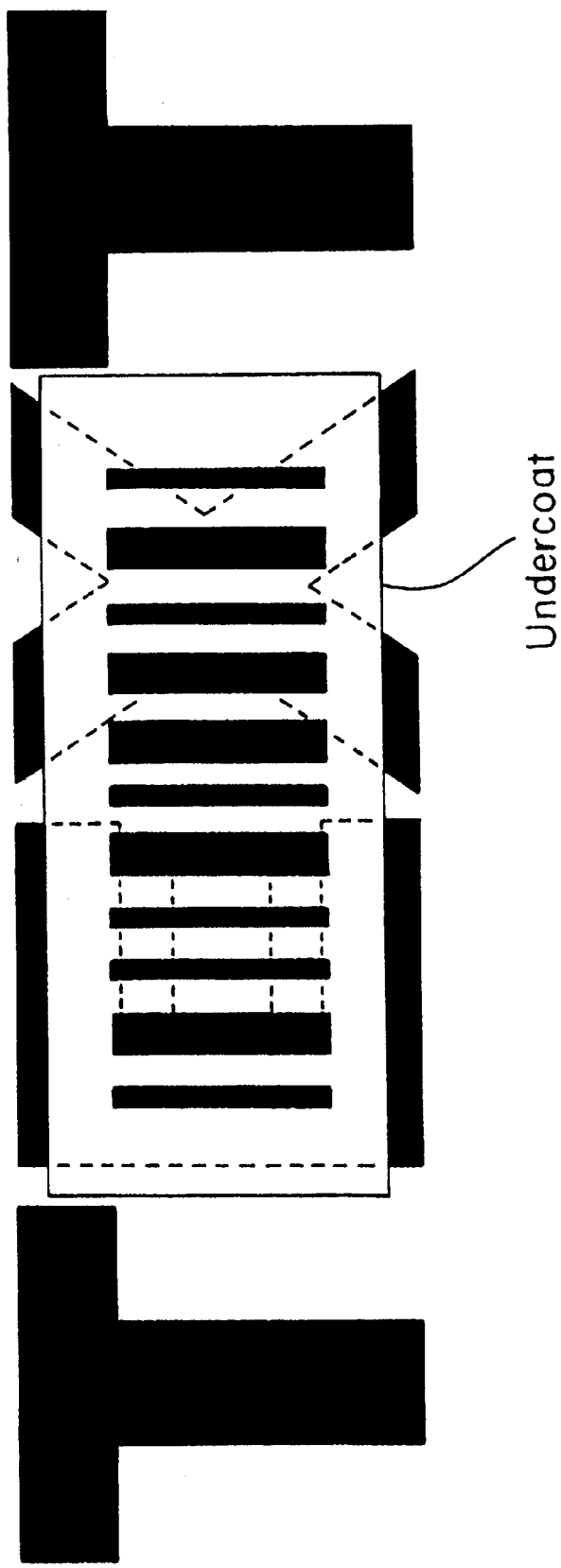
FIG. 7 illustrates an invisible fluorescent bar code signal applied over an invisible, near infrared absorbing coating.

A uniform layer of an NIR fluorescent, invisible ink 1, containing a silicon naphthalocyanine fluorophore (NcSi), is applied to a substrate. An invisible mark such as a bar code is then applied using a second phenoxy]PcH$_2$, which fluoresces at a different wavelength in the near-IR region. FIG. 7 shows a schematic representation of an invisible, fluorescing bar code applied over a uniform layer of a first invisible, NIR absorbing ink that can also be fluorescing. The scanner depicted in FIG. 7 is used to decode the invisible barcode.

The view of the underlying text is not obstructed in any way by either of the invisible inks.

The invention has been described in detail with particular reference to preferred embodiments thereof, but it will be understood that variations and modifications can be effected within the spirit and scope of the invention.

What is claimed is:

1. An apparatus for detecting an invisible, near infrared fluorescing mark disposed on a background having varying reflectance, said apparatus comprising:

an excitation source for exciting said mark, said source having a maximal power level sufficient to provide a fluorescent signal from said mark when disposed on a least reflective portion of said background;

signal detecting means for detecting said fluorescent signal; and power modulating means for varying said power between zero and said maximal power level in such manner to produce a decodable fluorescent signal from a mark disposed on any portion of said background, said power modulating means including an electronic circuit comprising an on/off switch to vary the power of said excitation source through preset average power levels of about 20, 40, 60, 80 and 100 percent of the maximal power level of said excitation source.

2. The apparatus of claim 1 wherein said excitation source comprises a laser having a maximal power level of at least about 10 mW.

3. The apparatus of claim 2 wherein said excitation source comprises a laser having a maximal power level of at least about 20 mW.

4. The apparatus of claim 3 wherein said excitation source comprises a laser having a maximal power level between about 30 mW and 70 mW.

5. The apparatus of claim 2 wherein said electronic circuit provides a square wave voltage signal, said voltage signal comprising said on/off switch for varying the power levels of the laser substantially linearly between zero and its maximal level.

6. The apparatus of claim 2 further comprising repeating means for exciting the mark and detecting the fluorescent signal at each of the preset levels of said laser.

7. The apparatus of claim 6 wherein said repeating means comprises a multifaceted mirror wheel or a vibrating mirror.

8. The apparatus of claim 1 wherein said excitation source comprises a red or near infrared (NIR) emitting diode laser.

9. The apparatus of claim 8 wherein said red or near infrared (NIR) emitting diode laser is a pulsable laser.

10. The apparatus of claim 8 wherein said excitation source further comprises a second red or near infrared (NIR) emitting diode laser.

11. The apparatus of claim 1 wherein said excitation source comprises a light emitting diode (LED).

12. The apparatus of claim 1 wherein said signal detecting means comprises a first detector for detecting a fluorescent light signal from said mark.

13. The apparatus of claim 12 wherein said first detector further detects at least a portion of light reflected from said background.

14. The apparatus of claim 13 wherein said first detector further comprises a polarizer, said polarizer being effective to attenuate a signal from light reflected from said background to a greater extent than the fluorescent signal from said mark, thereby reducing interference of said fluorescent signal by the reflected light.

15. The apparatus of claim 13 wherein said signal detecting means further comprises a second detector.

16. The apparatus of claim 15 wherein said second detector detects substantially only light reflected from said background.

17. The apparatus of claim 16 wherein said first detector detects the fluorescent signal from said mark and said first and second detectors each detect approximately equal amounts of light reflected from said background.

18. The apparatus of claim 17 further comprising an instrumentation amplifier circuit, said circuit being effective to cancel a reflected light signal detected by said first detector and to amplify the fluorescent signal from said mark detected by said first detector.

19. The apparatus of claim 15 wherein said second detector detects a fluorescent signal from said background whose wavelength is substantially separated from the wavelength of the fluorescent signal from said mark.

20. The apparatus of claim 17 further comprising a second excitation source for generating a fluorescent signal whose wavelength is substantially separated from the wavelength of the fluorescent signal from said mark.

21. The apparatus of claim 12 further comprising a second detector, said second detector detecting substantially only light reflected from said background, wherein said power modulating means comprises a voltage detector circuit for detecting a reflected light signal from said second detector, and wherein said voltage detector circuit operates to vary the power of said laser between zero and its maximal level to maintain the reflected light signal from said second detector at a substantially constant level, thereby producing a decodable fluorescent signal from said mark.

22. A process for decoding an invisible mark comprising a near infrared (NIR) fluorescing material, said process comprising:

providing at least one invisible, near infrared (NIR) fluorescing mark disposed on at least one portion of a background;

exciting said mark with a laser having a maximal power level sufficient to provide a fluorescent signal from said mark when disposed on a least reflective portion of said background; and detecting said fluorescent signal and concurrently varying the power of the laser between zero and its maximal power level using an electronic circuit that provides a square wave voltage signal that includes an on/off switch to vary the average power output of the laser through preset average power levels of about 20, 40, 60, 80 and 100 percent of the maximal power level of said laser to produce a decodable fluorescent signal from a mark disposed on any portion of said background.

23. The process of claim 22 wherein said laser has a maximal power level of at least about 10 mW.

24. The process of claim 23 wherein said laser has a maximal power level of about 50 mW.

25. The process of claim 22 wherein said laser is a pulsable, red or near infrared (NIR) emitting diode laser.

26. The process of claim 22 wherein the power of the laser is varied between zero and its maximal power level using a first detector for detecting the fluorescent signal from the mark, a second detector for detecting substantially only light reflected from the background, and a voltage detector circuit for detecting a signal from said second detector, said voltage detector circuit operating to vary the power of the laser between zero and its maximal level to maintain said signal from said second detector at a substantially constant level, thereby producing a decodable fluorescent signal from said mark.

27. A process for enhancing the decodability of an invisible, fluorescing mark, said process comprising:

providing at least one invisible mark comprising a near infrared (NIR) fluorescing material on a background comprising a uniformly distributed, invisible, near infrared (NIR) absorbing material; and irradiating the fluorescing mark and the background using a red or near infrared (NIR) emitting laser, thereby producing a fluorescent signal from said mark, said fluorescent signal having enhanced decodability resulting from absorption of radiation from said laser by said uniformly distributed near infrared (NIR) absorbing material in said background.

28. The process of claim 27 wherein said uniformly distributed, near infrared (NIR) absorbing material is substantially nonfluorescing.

29. The process of claim 28 wherein said nonfluorescing, near infrared (NIR) absorbing material comprises a metal phthalocyanine dye.

30. The process of claim 27 wherein said uniformly distributed, near infrared (NIR) absorbing material provides a fluorescent signal at a wavelength substantially separated from the wavelength of the fluorescent signal from said mark.

31. The process of claim 30 wherein said fluorescent signal from said mark is detected by a first detector included within a scanning apparatus and said fluorescent signal from said uniformly distributed, near infrared (NIR) absorbing material is detected by a second detector within said scanning apparatus.

32. The process of claim 30 wherein said mark comprises a phthalocyanine fluorophore and said fluorescing, uniformly distributed near infrared (NIR) absorbing material comprises a naphthalocyanine fluorophore.

33. The process of claim 30 wherein said mark comprises a naphthalocyanine fluorophore and said fluorescing, uniformly distributed near infrared (NIR) absorbing material comprises a phthalocyanine fluorophore.

34. An invisible marking system having improved decodability, said system comprising:

a substrate comprising a uniformly distributed, invisible, near infrared (NIR) absorbing material; and at least one invisible mark comprising a near infrared (NIR) fluorescing material, wherein a fluorescent signal resulting from irradiation of said mark by a red or near infrared (NIR) emitting laser has enhanced decodability resulting from absorption of radiation from said laser by said uniformly distributed near infrared (NIR) absorbing material in said substrate.

35. The invisible marking system of claim 34 wherein said near infrared (NIR) absorbing material uniformly distributed in said substrate is nonfluorescing.

36. The invisible marking system of claim 35 wherein said nonfluorescing, near infrared (NIR) absorbing material in said substrate comprises a metal phthalocyanine dye.

37. The invisible marking system of claim 34 wherein said near infrared (NIR) absorbing material uniformly distributed in said substrate provides a fluorescent signal at a wavelength substantially separated from the wavelength of the fluorescent signal from said mark.

38. The invisible marking system of claim 37 wherein said mark comprises a phthalocyanine fluorophore and said fluorescing uniformly distributed said near infrared (NIR) absorbing material in said substrate comprises a naphthalocyanine fluorophore.

39. The invisible marking system of claim 37 wherein said mark comprises a naphthalocyanine fluorophore and said fluorescing uniformly distributed said near infrared (NIR) absorbing material in said substrate comprises a phthalocyanine fluorophore.

* * * * *

UNITED STATES PATENT AND TRADEMARK OFFICE
CERTIFICATE OF CORRECTION

PATENT NO : 5,959,296
DATED : September 28, 1999
INVENTOR(S) : Michael John Cyr; James John Krutak, Sr.; Horst Clauberg; Randy Barnett Meade; and James Edward Moore It is certified that error appears in the above-identified patent and that said Letters Patent is hereby corrected as shown below:

On the title page, item [57]

<u>In the Abstract</u>

Line 2, after "background" delete "comprises:".

Line 3, after "excitation source" delete "for exciting the mark,".

Line 4, after "signal" insert --from--.

Line 5, after "mark" delete "from a".

Line 6, after "mark" delete "a"; after "and" insert --a--; after "modulator" delete "means".

Line 7, after "power" delete "if" and insert --of-- therefor.

Signed and Sealed this

Seventh Day of March, 2000

Attest:

*Attesting Officer*

Q. TODD DICKINSON

*Commissioner of Patents and Trademarks*